3,141,819
DIELDRIN-PMDS COMPOSITIONS FOR PROTECTION OF WOOL
Saikichi Hirashima, Osaka, Japan, assignor to Takeda Chemical Industries, Ltd., Osaka, Japan
No Drawing. Filed July 30, 1962, Ser. No. 213,086
7 Claims. (Cl. 167—38.6)

The present invention relates to an agent for the protection of wool from damage caused by insects and microorganisms, and to a method for treating wool with such agent. Concisely stated, according to the invention, wool is treated with an aqueous emulsion of the agent which concomitantly comprises phenyl mercuric dioctyl sulfosuccinate (hereinafter abbreviated as PMDS) and 1,2,3,4,10,10 - hexachloro-6,7-epoxy-1,4,4a,5,6,7,8,8a-octahydro-1,4,5,8-dimethanonaphthalene (hereinafter referred to as Dieldrin). Microorganisms in the sense of the present invention are those which damage wool, such as fungi, bacteria, etc.

Under normal circumstances, there exist many kinds of pathological or non-pathological bacteria or fungi, and these may invade the human body or adhere to underwear or socks or the like by the medium of dust, sweat, etc., and stimulate skin or mucous membrane to cause skin-trouble. Also, unpleasant odor caused by such microorganisms or the substances decomposed by microorganisms may be emitted from underwear or socks, etc. It is often experienced that animal fibers, especially wool fibers are severely damaged by insects such as common moth, casebearer moth, tapestry moth, black carpet beetle, varied carpet beetle, common carpet beetle, fur beetle, etc., making the animal fibers unfit for practical use. The above-cited insects multiply extremely magnitudinously; for instance, one female insect produces about 1,560,000 larvae and these become imagoes after the lapse of two months to a year. The larvae will continuously eat wool exposed to them during the larvae periods. Therefore, there has been a constant demand for a strong effective agent to prevent wool from damage caused by insects as well as by microorganisms.

Although agents effective only on insects and those effective only on microorganisms are known, at least two steps of treatment are required for preventing damage of wool caused by insects and microorganisms. Namely, the wools must be treated on the one hand with an agent for the suppression of insects and on the other hand with an agent for the suppression of microorganisms.

PMDS has been known as an agent effective only on microorganisms, while Dieldrin is known as effective only on insects, and both have been utilized widely. However, neither prevent wool against both insects and microorganisms. It is most desirable that the preventive effect on insects and microorganisms be obtained by one and the same agent.

According to the present invention, when PMDS and Dieldrin are contained together in one and the same agent, the components influence each other and, consequently, each effect is strengthened synergistically. Therefore, the agent which contains PMDS together with Dieldrin in the same agent shows a stronger preventive effect on insects and microorganisms than the sum of the respective effects of PMDS and Dieldrin employed individually. Furthermore, by the present invention, the preventive effect on both insects and microorganisms is obtained by a single process of treatment.

The object of the present invention thus resides protecting wool from damage caused by insects and microorganisms. Another object lies in providing an agent which is utilizable on wool for the prevention of damage by insects and microorganisms. These objects are realized by providing an agent which concomitantly comprises both PMDS and Dieldrin.

Properties possessed by the agent of the present invention are summarized in the following:

(1) The preventive effect on insects and microorganisms is very strong, compared with other agents of this kind. For example, the agent of the present invention shows about one hundred as strong an effect as pentachlorophenol and twice as strong an effect as an organic tin compound.

(2) The preventive effect is long-lasting. The agent is also stable to light, heat, change of pH, etc. Therefore, the preventive effect is not decreased even if wool processed by the agent of the present invention is exposed to air, sunlight, etc., or is subjected to such treatments as steam pressing, hot iron pressing, cleaning, etc.

(3) The agent is substantially harmless and does not adversely stimulate skin or mucous membrane.

(4) It is colorless and has no unpleasant odor, thus causing no irritation on this account.

(5) It does not damage the quality of wool.

(6) It can easily permeate wool and its adheres securely thereto.

PMDS and Dieldrin are hardly soluble in water, but they may advantageously be employed in a state of emulsion after dissolution in an organic solvent. The resultant solution (concentrate) should contain 5 to 15 parts by weight of PMDS and 10 to 20 parts by weight of Dieldrin. As organic solvents, there may be used, for example, benzene, toluene, xylene, styrene, toluidine, trichloroethylene, acetone, dioxane, etc. These may be employed severally or as a mixture of one or more solvents, or further solvents such as methanol, ethanol, isopropanol, ethyleneglycol, ethylether, chloroform, etc., may be added to the above mentioned solvents. When put into practical use, the emulsion may be dispersed in water to obtain an aqueous emulsion containing a suitable concentration of each component. The preferable concentration of PMDS and Dieldrin varies according to the kind of woolen product, the state of wool, etc. In general, an aqueous emulsion concentrate which contains 5–10% by weight of Dieldrin and a corresponding quantity of PMDS is first prepared, and the emulsion is diluted with water to 300–1000 times its volume, when put into practical use. Of course, PMDS or Dieldrin of high purity is desirable, but low purity products may be employed so long as they do not damage wool and are not injurious to the human body.

An emulsifier such as a surface active agent is preferably included in the emulsion. Among the surface active agents, the non-ionic surfactants such as complex-esters, and ester-ethers of polyhydroxylic alcohol alkylene oxide and fatty acids, are most preferable.

With thus-obtained emulsion, wool is treated to obtain the protective action against insects and microorganisms. Generally, wool is treated by such a method as being immersed in the emulsion, spraying the emulsion thereon, etc. These procedures may be carried out at room temperature (15 to 30° C.) or while heating to about 100° C.

The processing may be effected before or after the wool is manufactured or in the process of the manufacturing. For example, the wool may be treated before or during bleaching or before or after or simultaneously with dyeing, etc. Also, the processing may be easily conducted at home, for example, at the time of washing or before storage, etc.

The following data demonstrate the preventive effect of the agent by the present invention on insects and microorganisms.

Emulsion A, which contains 10% of PMDS and 18.5% of Dieldrin:

I. Preventive effect on microorganisms:
(1) Fungi and bacteria for the test—A mix culture of four fungi listed in the Japanese Industrial Standard for testing fungicidal activity (hereinafter abbreviated as JIS mix-fungi):

Aspergillus niger _____ ATCC 6275
Penicillium citrinum _____ ATCC 9849
Chaetomium globosum _____ ATCC 6205
Myrothecium verrucaria _____ ATCC 9095

Bacteria: Staphylococcus aureus _____ IFO 3061

(2) Sample—Wool-cloth which is controlled to contain about 70% by weight of water, and cut into a sheet of 3 centimeters x 3 centimeters.
(3) Method of the treatment with the agent—
 (a) Non-washing: The sample is immersed for 6 seconds or 10 minutes in the emulsion a, b, c, and d which are prepared by diluting emulsion A with water to 300 times, 500 times, 700 times, and 1000 times the original volume, respectively. Then the sample is squeezed to contain 80% of water and dried at 45–50° C. for 4 hours.
 (b) Washing: The sample, for washing, is further immersed after the treatment (a) 3 times in a solution which comprises 0.1% by weight of sodium carbonate and 0.2% by weight of soap, then is washed again with water.
(4) Method of the test—10 milliliters of 1.7% of liquid-agar is poured into a dish of 9 centimeters in diameter. After the agar has solidified, each sample which has been already treated with the agent is put in the middle of the dish. Then JIS mix-fungi or bacteria are inoculated. Then medium is incubated for 1–7 days at 24–32° C.
(5) Result—
 (A) Results obtained by incubating JIS mix-fungi for 4 days:

| Kind of sample | Invasion time | Concentration of the agent ×300 | ×500 | ×700 | ×1,000 | Control |
|---|---|---|---|---|---|---|
| Non-washing | 10 minutes: (a) | — | — | — | — | +++ |
|  | (b) | 11–12 | 6–12 | 0–3 | 0–3 | 0 |
| Do | 6 seconds: (a) | — | — | — | — | +++ |
|  | (b) | 0–2 | 0–1 | 0–1 | 0–1.5 | 0 |
| Washing | 10 minutes: (a) | — | — | — | — | +++ |
|  | (b) | 7–9 | 2.5–3 | 0.5–3 | 0.5 | 0 |

"a" shows whether JIS mix-fungi increases on the surface of the sample or not.
—: Fungi does not increase on the surface of the sample.
+, ++, +++: Fungi increase in the surface of the sample.
"b" shows values preventing the increase on the sample.

(B) Results obtained by incubating JIS mix-fungi for 7 days:

| Kind of sample | Invasion time | Concentration of the agent ×300 | ×500 | ×700 | ×1,000 | Control |
|---|---|---|---|---|---|---|
| Non-washing | 10 minutes: (a) | — | — | — | — | ++ |
|  | (b) | 12 | 11 | 2 | 3 | 0 |
| Do | 6 seconds: (a) | — | — | — | — | ++ |
|  | (b) | 1.5 | 1 | 1 | 1 | 0 |
| Washing | 10 minutes: (a) | — | — | — | — | ++ |
|  | (b) | 8 | 2.5 | 2.5 | 2.5 | 0 |

"a" and "b" have the same meaning as stated above.

(C) Results obtained by incubating Staphylococcus aureus:

| Kind of sample | Invasion time | Concentration of the agent ×300 | ×500 | ×700 | ×1,000 | Control |
|---|---|---|---|---|---|---|
| Non-washing | 10 minutes: (a) | — | — | — | — | + |
|  | (b) | 24–30 | 20–30 | 10–30 | 6–8 | 0 |
| Do | 6 minutes: (a) | — | — | — | — | + |
|  | (b) | 10–18 | 3–6 | 1–5 | 0.5–5 | 0 |
| Washing | 10 minutes: (a) | — | — | — | — | + |
|  | (b) | 10–11 | 8–9 | 2–8 | 2–3 | 0 |

"a" shows whether Staphylococcus aureus increases or not.
"b" has the same meaning as stated above.

II. Preventive effect on insects:
(1) Larvae of black carpet beetle (Attagenus piceus Oliver) fed by pupa-powder for 110 days.
(2) Sample—Muslin which is controlled to contain about 70% of water.
(3) Method of treatment with the agent—
 (a) The sample is immersed for 6 seconds or 10 minutes in the emsulsion a, b, c and d which are prepared by diluting emulsion A with water to 300 times, 500 times, 700 times and 1000 times, respectively.
 (b) The sample for washing is further immersed after treatment (a), 3 times in a solution which contains 0.1% by weight of sodium carbonate and 0.2% by weight of soap, then is washed again with water.
(4) Method of the test—Each sample which has been treated with the agent is cut into a sheet of 2 centimeters x 2 centimeters and is put into a small dish of 4.5 centimeters in diameter and 1.5 centimeters high together with 3 heads of insects. Then the dishes are kept at constant temperature of 25±0.5° C. and at the constant relative humidity of 70±5% for 15 days.
(5) Result—
 (A) Non-washing:

| Invasion time: | Concentration values being diluted × | Number of live insects | Number of dead insects | Number of poisoned [1] insects (after 7 days) | Weight eaten by insects (milligrams) |
|---|---|---|---|---|---|
| 10 minutes | 300 | 6 | 3 | 7 | 0 |
|  | 500 | 7 | 2 | 7 | 0.5 |
|  | 700 | 7 | 2 | 7 | 0.3 |
|  | 1,000 | 6 | 3 | 7 | 0 |
| 6 seconds | 300 | 6 | 3 | 6 | 0 |
|  | 700 | 5 | 4 | 7 | 0 |
|  | 500 | 8 | 1 | 7 | 0 |
|  | 1,000 | 7 | 2 | 4 | 0 |
| Control |  | 9 | 0 | 0 | 6.7 |

[1] Poisoned insect means an insect which reposes bending its abdomen to inner side, and responds only slightly when being touched by tweezers.

(B) Washing:

| Invasion time: | Concentration values being diluted × | Number of live insects | Number of dead insects | Number of poisoned [1] insects (after 7 days) | Weight eaten by insects (milligrams) |
|---|---|---|---|---|---|
| 10 minutes | 300 | 5 | 4 | 7 | 0.3 |
|  | 500 | 9 | 0 | 4 | 0 |
|  | 700 | 8 | 1 | 5 | 0 |
|  | 1,000 | 8 | 1 | 2 | 0.5 |
| 6 seconds | 300 | 7 | 2 | 5 | 0 |
|  | 500 | 9 | 0 | 4 | 0.5 |
|  | 700 | 9 | 0 | 4 | 0.5 |
|  | 1,000 | 9 | 0 | 4 | 0.5 |
| Control |  | 9 | 0 | 0 | 8.0 |

The following examples are given for the purpose of illustrating presently preferred embodiments of this invention, although they are not intended to constitute a restriction or limitation of the scope of this invention. And it should be understood that any modification and any variation of the method substantially described in the foregoing description as well as in the appended claims are encompassed in the scope of this invention.

*Example 1*

An emulsion is prepared from:  Parts by weight
Phenyl mercuric dioctyl sulfosuccinate _____ 10
Dieldrin _____ 18.5
Polyoxyethylene nonyl phenylether _____ 20
Xylene to give a total of _____ 100

*Example 2*

An aqueous emulsion is prepared by diluting the emulsion obtained in Example 1 with water to 500 times the original volume. Wool-underwear is immersed in thus-obtained aqueous emulsion just after the washing and is thereby protected against invasion by microorganisms and insects.

The aqueous emulsion may be applied by a spray gun, if desired.

The surfactant of Example 1 may be replaced by a corresponding quantity of an other suitable surfactant, and the xylene by a corresponding quantity of other organic solvent.

Having thus disclosed the invention, what I claim is:

1. A concentrate which is dilutable with water to produce a composition for the protection of wool from damage caused by insects and microorganisms, which concentrate concomitantly comprises phenyl mercuric dioctyl sulfosuccinate and 1,2,3,4,10,10-hexachloro-6,7-epoxy-1,4,4a,5,6,7,8a - octahydro - 1,4,5,8-dimethanonaphthalene in solution in organic solvent in the proportion of 5 to 15 parts by weight of the former for every 10 to 20 parts by weight of the latter.

2. An agent for the protection of wool from damage caused by insects and microorganisms, which concomitantly comprises 5–15% by weight of phenyl mercuric dioctyl sulfosuccinate and 10–20% by weight of 1,2,3,4,10,10 - hexachloro-6,7-epoxy-1,4,4a,5,6,7,8,8a-octahydro-1,4,5,8-dimethanonaphthalene in an aqueous liquid carrier.

3. A method for protecting wool from damage caused by insects and microorganisms, which comprises applying to the wool an aqueous emulsion of a concentrate as claimed in claim 1.

4. A method for protecting wool from damage caused by insects and microorganisms, which comprises applying to the wool an aqueous emulsion of an agent as claimed in claim 2.

5. Wool treated with an aqueous emulsion of a concentrate as claimed in claim 1.

6. Wool treated with an aqueous emulsion of an agent as claimed in claim 2.

7. In a pesticidal composition for the protection of wool from damage caused by insects and microorganisms, the combination of phenyl mercuric dioctyl sulfosuccinate and 1,2, 3,4,10,10-hexachloro-6,7-epoxy-1,4,4a,5,6,7,8,8a-octahydro-1,4,5,8-dimethanonaphthalene.

References Cited in the file of this patent

UNITED STATES PATENTS

| | | |
|---|---|---|
| 2,118,033 | Anderson _____ | May 24, 1938 |
| 2,325,411 | Lynch _____ | July 27, 1943 |
| 2,423,044 | Nowak _____ | June 24, 1947 |
| 2,692,204 | Nowak _____ | Oct. 19, 1954 |

FOREIGN PATENTS

| | | |
|---|---|---|
| 13,625 | Japan _____ | Aug. 17, 1961 |

OTHER REFERENCES

"Handbook of Aldrin, Dieldrin, and Endrin Formulations," SC: 54–39 Shell Chem. Corp., New York, New York, 1954, pp. 45–60.